(12) United States Patent
Popa et al.

(10) Patent No.: US 9,954,684 B2
(45) Date of Patent: Apr. 24, 2018

(54) SECURE SHARING

(71) Applicant: PreVeil LLC, Boston, MA (US)

(72) Inventors: Raluca Ada Popa, Berkeley, CA (US); Nickolai Zeldovich, Lexington, MA (US); Sanjeev Verma, Lincoln, MA (US); Randall Steven Battat, Weston, MA (US); Aaron Delano Burrow, Cambridge, MA (US)

(73) Assignee: PreVeil LLC, Boston, MA (US)

( * ) Notice: Subject to any disclaimer, the term of this patent is extended or adjusted under 35 U.S.C. 154(b) by 0 days.

(21) Appl. No.: 15/056,252

(22) Filed: Feb. 29, 2016

(65) Prior Publication Data

US 2017/0250816 A1    Aug. 31, 2017

(51) Int. Cl.
*G06F 21/12*  (2013.01)
*G06F 21/62*  (2013.01)
*H04L 9/32*   (2006.01)
*H04L 29/06*  (2006.01)

(52) U.S. Cl.
CPC .......... *H04L 9/3247* (2013.01); *G06F 21/12* (2013.01); *G06F 21/62* (2013.01); *H04L 63/0435* (2013.01); *H04L 63/061* (2013.01)

(58) Field of Classification Search
CPC ...................................................... G06F 21/62
See application file for complete search history.

(56) References Cited

U.S. PATENT DOCUMENTS

| 7,234,059 | B1* | 6/2007 | Beaver | H04L 9/0833 380/283 |
| 8,245,050 | B1* | 8/2012 | Subramanian | H04L 63/0428 380/277 |
| 2001/0055388 | A1* | 12/2001 | Kaliski, Jr. | H04L 9/085 380/30 |
| 2002/0071566 | A1* | 6/2002 | Kurn | H04L 63/062 380/281 |

(Continued)

OTHER PUBLICATIONS

Belenkiy, Mira, et al., "Disjunctive Multi-Level Secret Sharing", Brown University, Providence, RI 02912, USA, Jan. 11, 2008 (14 pages).

(Continued)

*Primary Examiner* — Jason C Chiang
(74) *Attorney, Agent, or Firm* — Fish & Richardson P.C.

(57) ABSTRACT

Among other things, at a central server, management of a document sharing process includes uploading from client devices through a communication network, storing at the server, and downloading to client devices through the communication network documents that are shared between users of the client devices. Encryption keys are used to protect features of the documents from unauthorized or unintended disclosure. Operations are performed on encryption keys or encrypted data as a result of which protection of features of the documents from unauthorized or unintended disclosure may be compromised. A determination is made whether performance of a given one of the operations on any of the encryption keys or encrypted data meets predefined conditions for approval by members of an approval group.

(Continued)

Performance of the operation on the encryption key or encrypted data is controlled based on a result of the determination.

6 Claims, 8 Drawing Sheets

(56) References Cited

U.S. PATENT DOCUMENTS

| | | | |
|---|---|---|---|
| 2003/0147535 A1* | 8/2003 | Nadooshan | H04L 9/085 380/277 |
| 2005/0018853 A1* | 1/2005 | Lain | H04L 9/0836 380/277 |
| 2007/0219915 A1* | 9/2007 | Hatano | H04L 9/0825 705/57 |
| 2011/0202755 A1* | 8/2011 | Orsini | H04L 63/029 713/151 |
| 2011/0307705 A1* | 12/2011 | Fielder | G06F 21/62 713/181 |
| 2012/0257756 A1* | 10/2012 | Huang | H04L 9/0836 380/281 |
| 2015/0135286 A1* | 5/2015 | Egan | H04L 63/0884 726/5 |
| 2015/0295907 A1* | 10/2015 | Abrahamson | H04L 63/065 713/150 |
| 2015/0312759 A1* | 10/2015 | Kim | G06F 21/10 455/411 |

OTHER PUBLICATIONS

Feldman, Ariel J., "SPORC: Group Collaboration using Untrusted Cloud Resources", Princeton University, retrieved from the Internet on Feb. 29, 2016, https://www.usenix.org/legacy/event/osdi10/tech/full_papers/Feldman.pdf , (14 pages).

Ghodosi, Hossein, et al., "Secret sharing in multilevel and compartmented groups", Information Security and Privacy, vol. 1438 of the series: Lecture Notes in Computer Science, pp. 367-378, May 23, 2006 (3 pages).

Li, Jinyuan, et al, "Secure Untrusted Data Repository (SUNDR)", NYU Department of Computer Science, retrieved from the Internet on Feb. 29, 2016, http://www.scs.stanford.edu/~dm/home/papers/li:sundr.pdf, 16 pages.

Popa, Raluca Ada, et al., "Building Web Applications on Top of Encrypted Data Using Mylar", UNENIX.org, retrieved from the Internet on Feb. 29, 2016, https://www.usenix.org/conference/nsdi14/technical-sessions/presentation/popa, 2 pages.

* cited by examiner

COLLECTION, 82

- DIRECTORY, 80 ——— DIRECTORY ID, 84
  - LIST, 86
    - ENTRIES, 88
      - FILE OR SUB- ——— DIRECTORY ID OR FILE ID, 92
        DIRECTORY NAME
        90
    - KEYS, 93
    - VALIDITY PERIOD, 100
  - INCOMING ENTRIES, 94
    - CLIENT INFORMATION, 96
    - FILE NAME HINT, 98
    - FILE ID, 99

FIG. 2

COLLECTION, 106

FILE, 104 ——— FILE 1D, 108

- VERSION, 110
- VERSION, 112
  - FILE KEY, 114 (COLLECTION READ KEY)
  - FILE CONTENT, 116 (FILE KEY)
  - FILE ATTRIBUTES, 118 (FILE KEY)
  - VERSION ID, 120
  - MODIFICATION TIME, 122
  - USER KEY, 123
  - DEVICE KEY, 125

FIG. 3

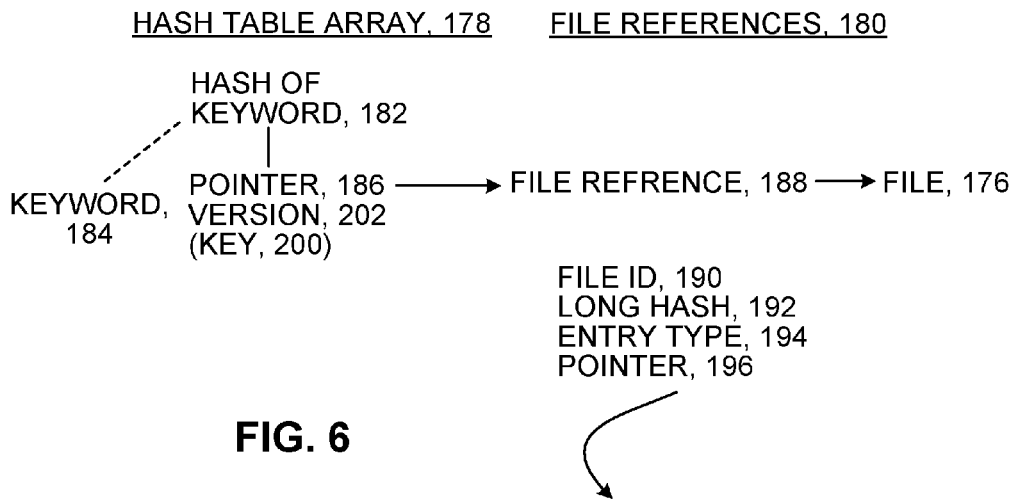
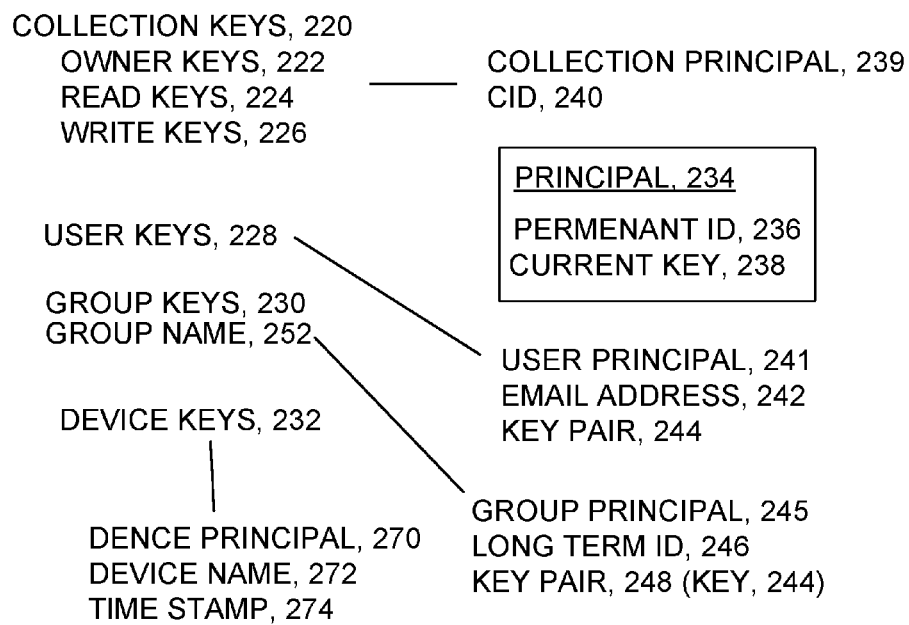

IDPs, 300
    DATABASE 302
      - USER EMAIL ADDRESSES 304
      - USER PUBLIC KEYS 306
      - APPROVAL GROUP 308
        - EMAIL ADDRESSES

FIG. 8

SECURE SHARING

BACKGROUND

This description relates to secure communication sharing.

Communications between users of communication networks such as the Internet are subject to compromise as they are carried over communication lines from node to node between a sending user and a server on the network and between the server and the receiving user. Such communications are also subject to compromise when they are stored at the server. A variety of techniques, including those based on private key-public key encryption techniques, are used in an attempt to make the communications secure. Highly secure systems tend to have user interfaces that require considerable knowledge and experience with the systems and require time and effort to use. To the extent that there are systems for securing communications that have easy-to-use user interfaces, they tend to be more vulnerable to attack.

SUMMARY

Terminology used in this formal summary will be understood from the later discussion.

In general, in an aspect, at a central server, management of a document sharing process includes uploading from client devices through a communication network, storing at the server, and downloading to client devices through the communication network documents that are shared between users of the client devices. Encryption keys are used to protect features of the documents from unauthorized or unintended disclosure. Operations are performed on encryption keys or encrypted data as a result of which protection of features of the documents from unauthorized or unintended disclosure might otherwise be subjected to compromised. A determination is made whether performance of a given one of the operations on any of the encryption keys or encrypted data meets predefined conditions for approval by members of an approval group. Performance of the operation on the encryption key or the encrypted data is controlled based on a result of the determination.

Implementations may include one or any combination of two or more of the following features. The controlling of the performance of the operation on the encryption key includes preventing the operation. The controlling of the performance of the operation on the encryption key includes tracking the operation. The operation on the encryption key includes updating a user's key. The determination whether the performance of the operation meets the predefined conditions includes an identification processor service receiving a signature of an approval group. The operation on the encryption key includes recovering a key. The operation on the encryption key includes recovering a user key. The operation on the encryption key includes recovering a key associated with a collection of the documents. The operation on the encryption key includes replacing one user key with another. The encryption key is secret-shared among members of an approval group. A server is part of an approval group. The secret-sharing includes nested secret sharing. The recovering the key includes applying a secure multi-party computation among members of an approval group. Applying the secure multi-party computation includes decryption of a chain of keys. The documents include email messages. The documents include direct or group chat messages. The documents include files.

In general, in an aspect, a secret-sharing process is applied to distribute a secret feature with respect to members of an approval group. A protected operation is permitted to be performed by retrieving the secret feature using the secret-sharing process and applying predefined conditions for approval by members of an approval group of the protected operation.

Implementations may include one or any combination of two or more of the following features. Each of the approval groups can be modified if authorized by a legitimate user and its approval group. The server and entity providers track changes to the approval group. The servers use their knowledge of the approval group to certify new public key of the user. The secret feature includes an encryption key. The encryption key is associated with a document sharing system. A server is part of the approval group. The secret-sharing includes nested secret sharing. The protected feature is associated with a system for sharing documents. The documents include email messages. The documents include direct or group chat messages. The documents include files.

In general, in an aspect, a secret-sharing process is applied to distribute a secret feature. The secret-sharing process is applied with respect to members of one or more approval groups. A protected operation is permitted to be performed with respect to information stored on a server by retrieving the secret feature using the secret-sharing process for all of the groups and applying the predefined conditions for approval by members of each of the approval groups. The server is included in each of the approval groups. Based on the inclusion of the server in each of the approval groups, each protected operation is logged that was performed based on approval by members of each of the approval groups.

Implementations may include one or any combination of two or more of the following features. Each of the approval groups can be modified if authorized by a legitimate user and its approval group, and the server and identity providers track changes to the approval group. The servers use their knowledge of the approval group to certify a new public key of the user. This approach distributes trust within the system including distributing trust both across a set of electronically accessible machines and also across a set of humans. It thus lowers the probability of a successful attack, because the attacker must be able to conquer all machines involved, not just one. The secret feature includes an encryption key. The encryption key is associated with a document sharing system. The secret-sharing includes nested secret sharing. The protected operation is associated with a system for sharing documents. The documents include email messages. The documents include direct or group chat messages. The documents include files.

In general, in an aspect, management of a document sharing process includes uploading from client devices through a communication network, storing at the server, and downloading to client devices through the communication network documents that are shared between users of the client devices. Access by each of the users to the document sharing process is provided through user interface features exposed to the user by one of the client devices. The control of access does not require the use of user passwords.

In general, in an aspect, management of a document sharing process includes uploading from client devices through a communication network, storing at the server, and downloading to client devices through the communication network documents that are shared between users of the client devices. The document sharing process includes posting at the central server of log entries that record information about performance of operations associated with the document sharing process. The posting of log entries is based on signatures associated with the operations, the signatures being associated with the client devices.

Implementations may include one or any combination of two or more of the following features. The operations for which log entries are posted include accesses to a collection. The operations for which log entries are posted include recovery of encryption keys associated with the document sharing process. The operations for which log entries are posted include accesses to keys for individual documents. The operations for which log entries are posted include accesses to indexes of documents as a result of a search.

In general, in an aspect, management of a document sharing process includes uploading from client devices through a communication network, storing at the server, and downloading to client devices through the communication network documents that are shared between users of the client devices. Operations are performed at the server associated with the document sharing only upon authentication by each of two or more identity provider servers. Authentication by each of the two or more identity provider servers is based in part upon approval by an approval group.

Implementations may include one or any combination of two or more of the following features. The number of identity provider services includes two. Approval by an approval group includes retrieving a secret that was shared among members of the approval group. The operations performed at the server include authenticating keys of users. Each of the identity provider services maintains user records each of which includes a public key of a user and information about an associated approval group. A request to update a user record is provided to at least one of the identity provider services. The request has been signed by a private key of the user and by the approval group. The operations to be performed include looking up an encryption key.

In general, in an aspect, a secret-sharing process is applied to distribute a secret feature. The secret-sharing process is applied with respect to members of an approval group. A protected operation is performed with respect to information stored on a server by retrieving the secret feature using the secret-sharing process for the groups and applying predefined conditions for approval by members of each of the approval groups of the protected operation. The server is included in the approval group. Based on the inclusion of the server in the approval group, a logging is enforced for each protected operation that was performed based on approval by members of the approval groups.

Implementations may include one or any combination of two or more of the following features. The protected operation includes updating a user's key. The determination whether the performance of the operation meets the predefined conditions includes an identification processor service receiving a signature of an approval group. The operation on the encryption key includes recovering a key. The operation on the encryption key includes recovering a user key. The operation on the encryption key includes recovering a key associated with a collection of the documents. The protected operation includes replacing one user key with another. The secret-sharing includes nested secret sharing.

In general, in an aspect, invocable user interface features are presented through a graphical user interface to an administrator of approval groups for a secure document sharing system used by an entity associated with the administrator. The invocable user interface features enable the administrator to add and remove approval groups, specify a member of an approval group by entering the member's name and taking only a single user interface action, specify a status of a member of an approval group by taking only a single user interface action, remove a member from an approval group by taking only a single user interface action, and associate an approval group with a category of event that occurs in the document sharing system by taking only a single user interface action.

Implementations may include one or any combination of two or more of the following features. A single table is displayed to the administrator for each approval group. The table lists members of the group and identifies the status of each member by an indicator that is invocable by the administrator to specify the status of the member. The single table is displayed to the administrator expressing policies for all of the categories of events that occur in the system, the single table containing an identifier for an approval group responsible for each of the corresponding categories of events, the identifier being invocable by the administrator to take the single user interface action to associate the approval group with the category.

These and other aspects, features, implementations, advantages, and combinations of them, can be expressed as systems, methods, apparatus, components, program products, methods of doing business, means or steps for performing functions, and in other ways.

These and other aspects, features, implementations, and advantages, and combinations of them, will become apparent from the following description, and from the claims.

DESCRIPTION

FIG. 2 is a schematic diagram of a collection.

FIG. 3 is a schematic diagram of a versioning arrangement.

FIG. 6 is a schematic diagram of the search index.

FIG. 7 is a schematic diagram of encryption keys and principals.

FIG. 8 is a schematic diagram of identification processors and approval groups.

Figure 9:
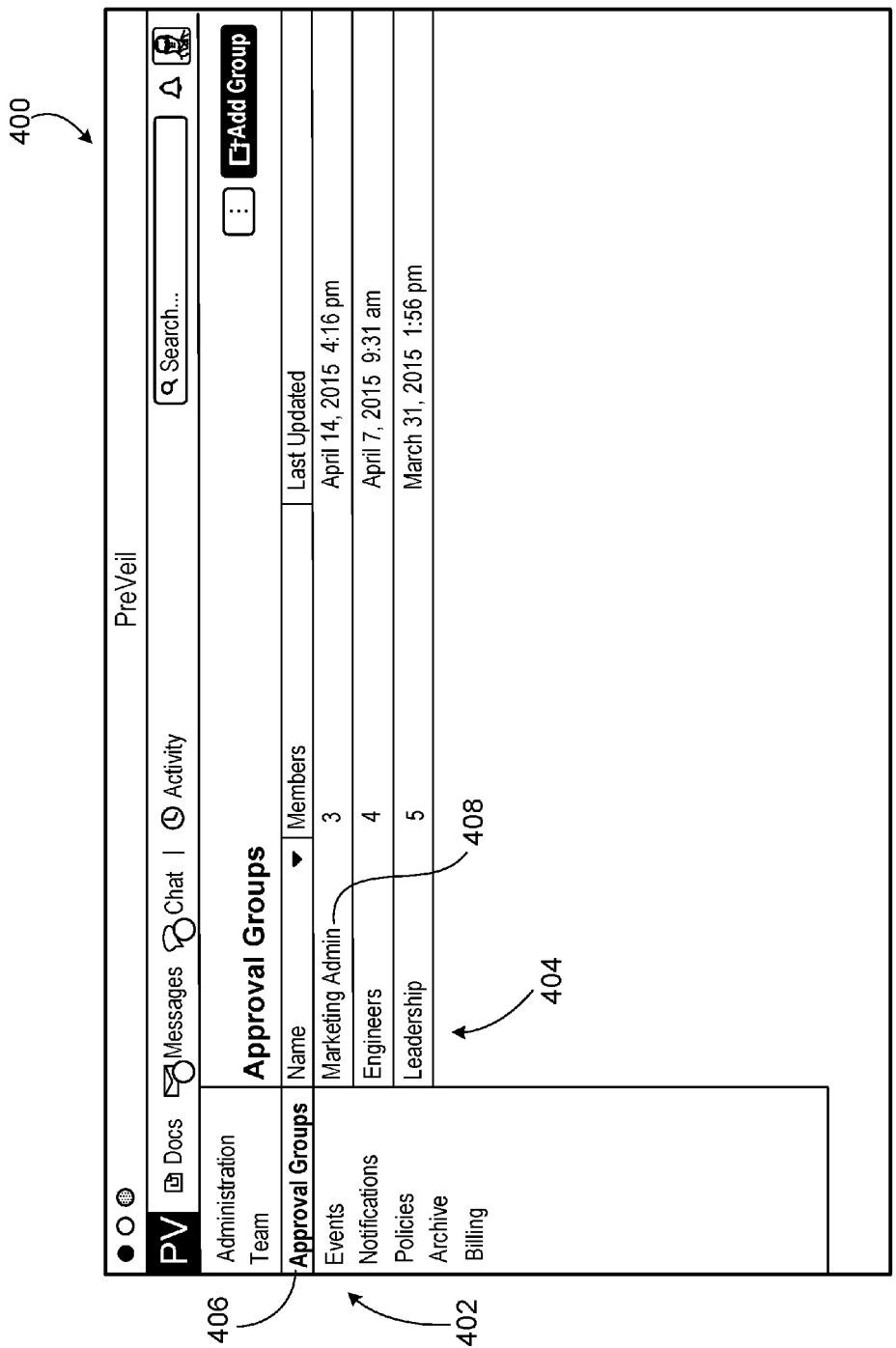
Figure 10:
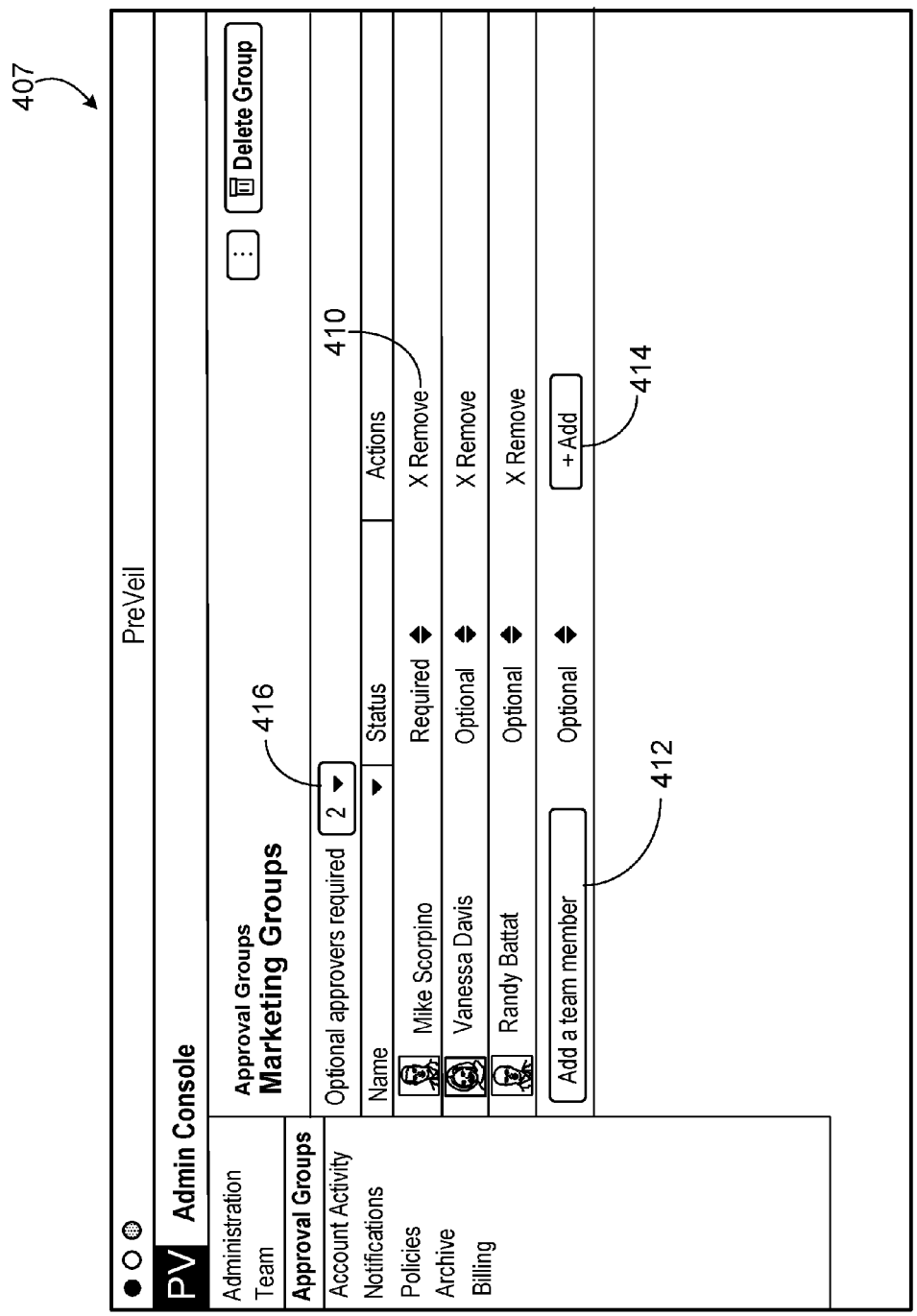
Figure 11:
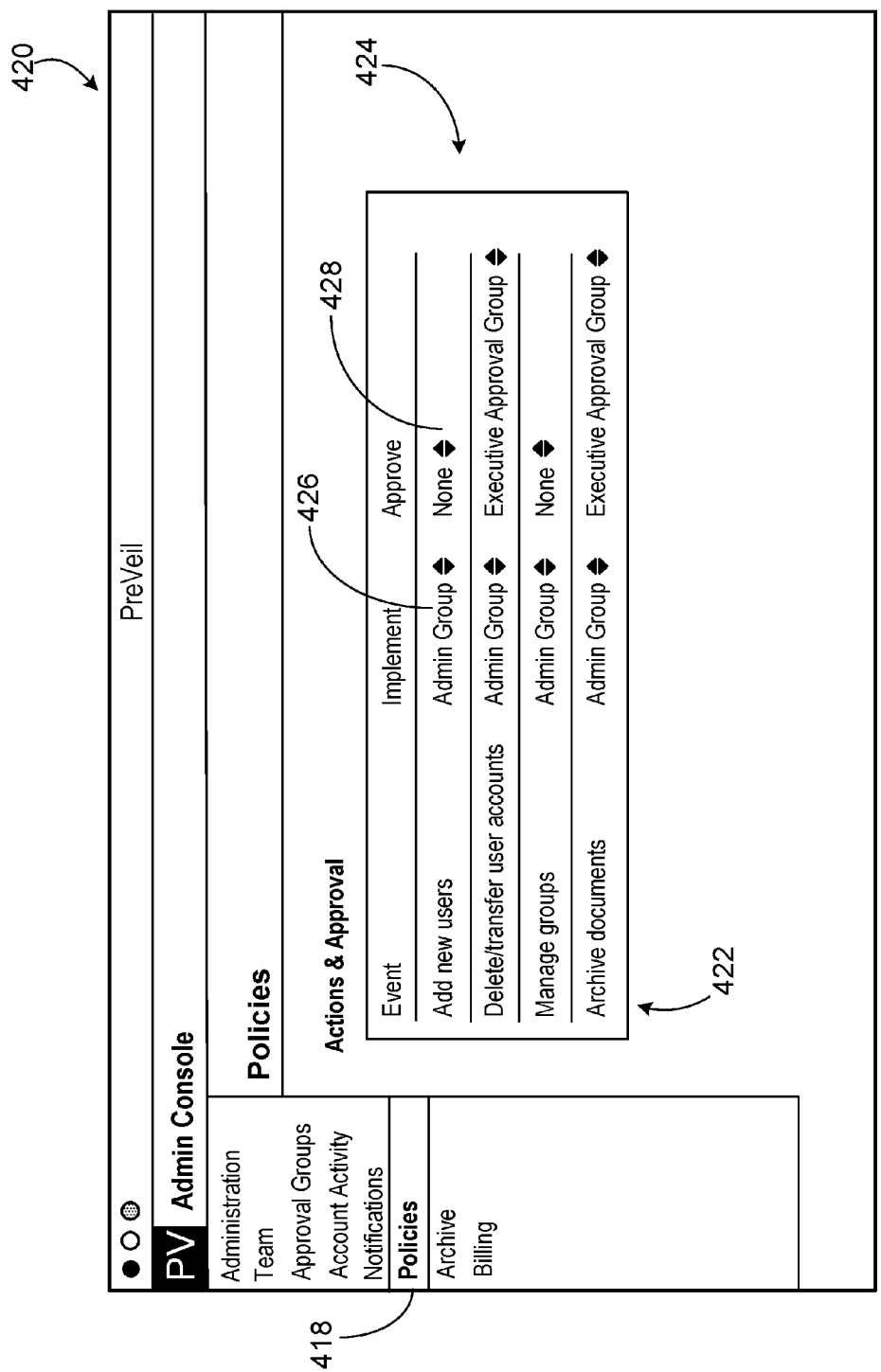

FIGS. 9, 10, and 11 illustrate webpages.

Here we describe systems and techniques (which we together sometimes call simply "the sharing system" or "system") that enable users easily, quickly, and securely to share documents and communications (including emails or director group chat messages) or other kinds of files or other kinds of content from user devices through the Internet or other communication networks and servers where the content may be processed, stored, and fetched, such as servers operated "in the cloud." We sometimes use the term "document" broadly to include, for example, any sort of file, communication, or any other digital entity, including, for example any digital entity that is the output of a program or application or mobile app or features offered by a web browser and through which a human being can express something that is to be communicated to another human being. We also sometimes use the word "file" or the word "content" interchangeably with the word document in that broad sense.

By using new approaches to public key-private key encryption, communication over public communication networks, and user interface features that we describe here, among other things, content to be shared and other information needed to operate the system can be stored securely on the servers. These systems and techniques protect against threats of adversaries of various kinds and make the content more secure and less vulnerable to attack. The systems and techniques that we explain below enable robust commercial grade sharing in which entities can exercise control at a fine grained level and end users can make use of the system easily.

Among other things, the document sharing system and techniques that we describe here allow users to share files; to search over file contents; to cryptographically protect and log changes to files; and to recover from compromised user accounts or devices. The underlying architecture should also be usable as a common back-end for email and other collaboration applications (such as for direct or group chat messages).

The system and techniques that we describe here are based on a threat model that considers the server to be honest but curious. This means that clients can assume correct responses for all requests made to the server, but that an adversary has access to all data stored at the server (including old versions of data, requests issued by clients, the times at which those requests were issued, etc.), and will try to learn as much information from this data as possible.

in some implementations, this threat model assumes:

1. The existence of several identity provider (IDP) servers at least one of which is honest but curious; the other IDPs can be arbitrarily malicious.

2. The server for the system that we are describing here may be compromised. However, the extent of the assumed compromise differs for different aspects of server functionality, to achieve the goal of protecting confidentiality of user data, but perhaps not its integrity. In some implementations, for managing keys, we assume that the server is arbitrarily malicious. To protect against arbitrary server actions with respect to management of keys, the system relies on IDPs to authenticate user keys and on other checks that we describe later. For other aspects of the server functionality (e.g., data sharing), the system assumes that the server is honest but curious.

Among other features and benefits of the sharing system are the following.

1. Sharing can be effected, for example, at an aggregation level corresponding to a file system tree or sub-tree (for example, a tree comprising a top-level directory and all files and subdirectories underneath it in the tree or sub-tree). We call the combination of the top-level directory and the files and subdirectories underneath it a collection. We use the term "collection" broadly to include, for example, any group of documents or files or content, including, for example, any set of documents or files or content that can be treated as a group by an application, program, mobile app, or features exposed through a web browser. A collection could also include a mailbox used for email.

2. The system enables synchronization and copying functions that apply, for example, to synchronizing or copying an entire collection from the server (we sometimes use the word "server" to refer either to a single server or a set of servers) onto an end-user device. This capability is useful, for example, for end-user devices that have enough memory to contain the entire collection, such as laptop and desktop user devices. The user device will typically have client software running on it that can communicate with the server; we sometimes refer to the end user devices as client devices, and vice versa. Furthermore, the client might download all of the encrypted files, but not download any of the file decryption keys. This would allow the server to audit when a client eventually does access the file (by requesting the decryption key), and at the same time allow the client to quickly start accessing the file locally once the keys are available (because the encrypted file data has already been downloaded).

3. An end-user device can access shared documents in a collection without having to synchronize or copy the entire collection. This capability is useful for clients (we sometimes use the simple word "clients" to refer to client devices or end-user devices, for example) that do not have enough storage space to hold an entire collection, such as smartphones or for client software that does not have broad access to the storage in other situations where it may not be desirable to replicate the entire contents of a directory on user client devices.

4. A user working through a user device can perform keyword searches over the contents of the collection, for example, all of the shared documents in the collection, even though a complete copy of the collection has not been stored on the user device.

5. Snapshot versions of files can be stored as subsequent versions are produced enabling the system to roll back to an earlier version of a file. This facility is useful as a backup mechanism, as well as for auditing use of the system and recovery of files after, for example, a failure (see discussion below).

6. Users can define policies that specify how long the system is to retain old versions of documents or other files (as mentioned earlier, we sometimes use the word documents to include any kind of file) and for how long documents or other files should continue to exist in the system (and be automatically deleted at the end of the specified time). This is also convenient when a backend portion of the system is used for email storage. It also can be useful for complying with corporate document retention policies.

Separately, the server can have a separate retention policy for logs.

7. The system can provide notifications about changed documents. This capability is useful in conjunction with the operation of other collaboration applications (e.g., notifications about new email messages or direct or group chat messages), and also in file sharing, for example, when a user wants to know about changes made by collaborators to documents. The function also is useful for low-latency propagation of document changes to client devices (for this purpose, the client software can subscribe to notifications of changes to a collection).

The system can impose the following security requirements, among others, to protect the security of documents and collections.

1. The system can set permissions for access at the level of granularity of an entire collection (that is, for a collection, all documents in the collection have the same access permissions). Although other levels of granularity could be imposed, controlling permissions in the same way for all documents in a collection is a good tradeoff for user simplicity and manageability. If users want different permissions, they can create different collections.

2. The system can enable a user to specify a read-only permission for a collection of shared documents.

3. An append-only permission can be set by a user to permit additional documents to be "uploaded" (i.e., appended) into a collection, without simultaneously enabling the reading of any documents in that collection, or the modification of any other documents in the collection. This feature, too, is useful in operating a backend to implement email or direct or group chat messages (in which the append only permission could be used for incoming messages). Such a feature can also be applied when using a collection to accumulate incoming documents, although the user interface for such an application will likely look different from traditional file-sharing.

4. The owner of the collection can be enabled to control the visibility of access control lists (ACLs) associated with the collection in order to prevent clients (e.g., clients associated with other users) from learning who is allowed to access the collection. In some implementations, the system enforces this feature only on a best-effort basis, because of the difficulty of providing strong guarantees about the visibility of access control lists. For example, an attacker who has been denied visibility of ACL members may learn their identity by tracking access patterns at the.

5. In some examples, the system can be set up for sharing only with "single-level" groups. That is, a collection can be shared with an entire group, in which case everyone in the group would have access; the sharing control in such examples would not allow control on a sub-group or per-user basis. In some implementations, nested groups are not permitted, which simplifies the design of the system and the management of groups by users.

6. The server can store access logs for a collection, in order to help audit which clients accessed which documents. To make these logs useful, each collection has an "on-demand" flag that hints to clients that they should not proactively download all files (or that it might be acceptable to download the encrypted files, but not the keys to decrypt the file contents.)

7. The system can require re-authentication of users of client devices. Using this feature, well-behaved client devices are periodically caused to forget decryption keys for documents in a collection (based on a re-authentication policy in force, for example, by collection or by device or a combination of both). Then, the users are required to re-authenticate themselves to re-obtain the keys. In some implementations, a collection to which such a policy applies has flags that tell the client about the collection policy.

8. Accounts of users of the system may sometimes be compromised. Client devices may also be compromised or stolen. Under those circumstances, and potentially others, the system enables the compromised user accounts or compromised or stolen client devices to recover from the compromises. In some cases, the server may be caused by an adversary to collude in the compromise. Then, it may be permissible to disclose documents that the compromised user account or device had access to at the time of the attack. The system, however, prevents the adversary from getting access to new documents that are added to the collection after access has been revoked. The system also lists changes made by the compromised user or the compromised device during the period of compromise (including both changes to documents and changes to access control lists) and enables the user who owns the collection to manually audit or revert (undo) the changes.

9. In certain instances, the system permits the recovery of a key associated with a particular user. This feature can become necessary if a user forgets her password and needs to recover her key and regain access, or if there are no passwords in the system and the user key is the only means of authentication to the system. The feature can also be used to recover a user's key if the user is missing (e.g., fired), with approval from other specified users (e.g., approval of both the user's boss and an administrator). The recovery actions are logged on the server and visible to the user whose key was recovered (to expose situations in which the recovery mechanism is misused).

10. In some cases, an approval group may be used in connection with the recovery of a collection key. Recovery of the collection key would enable an organization associated with the approval group to access data created by a user (for example in document discovery during litigation) without allowing an administrator to access the user's key (and therefore potentially take on the user's identity).

Throughout our discussion we refer to various kinds of operations that can be performed on encryption keys; these operations may also be performed with respect to other encrypted data that is not in the form of keys. When we refer to operations on encryption keys we also are typically referring to operations on such encrypted data.

Files and Directories

Collections

Figure 1:
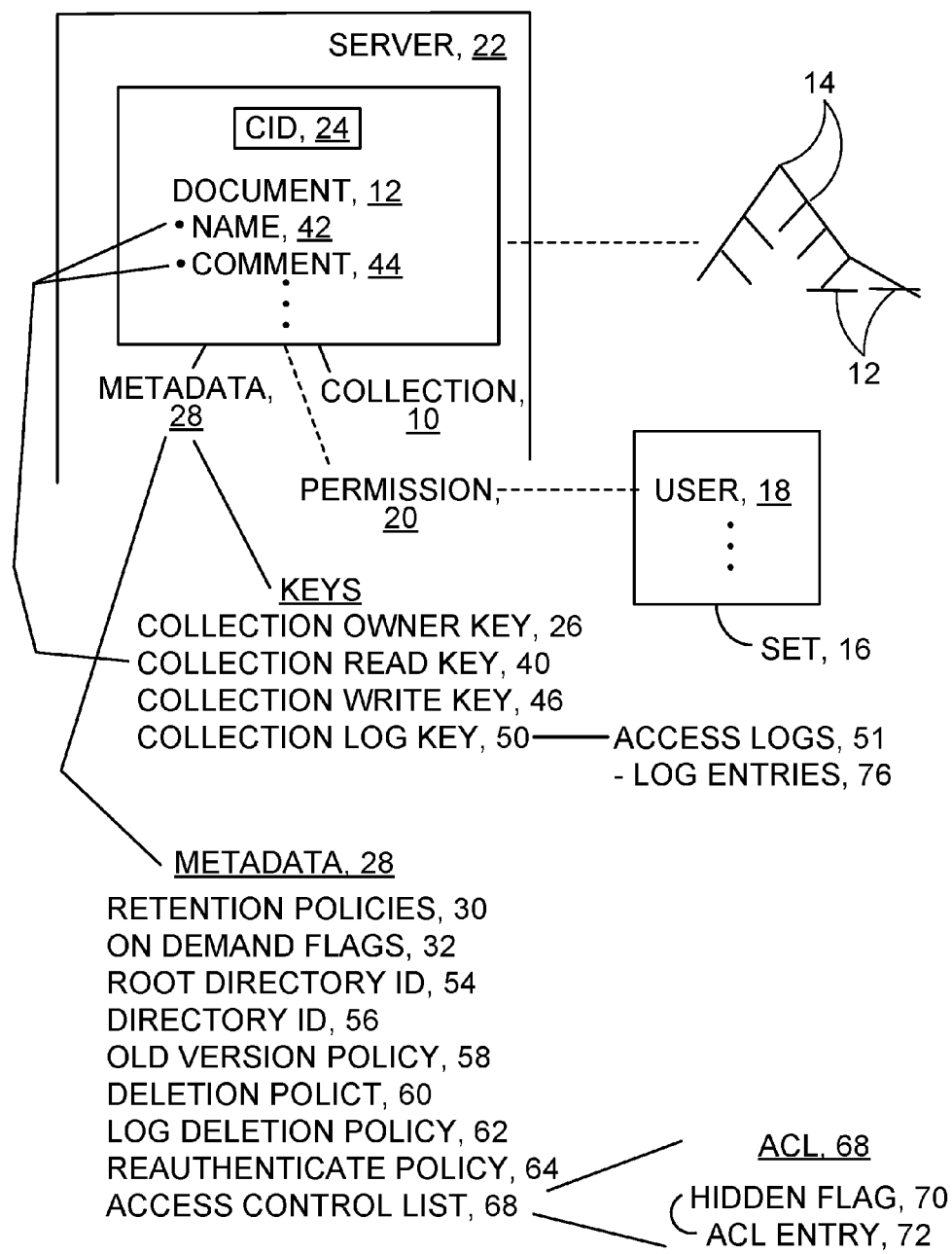
FIG. 1 is a schematic diagram of a document sharing system.

As shown in FIG. 1, in some implementations, the top-level construct in document sharing using the system is a collection 10 of documents 12. A collection can be thought of as a file system—a tree of directories 14 and files (e.g., documents 12)—that can be accessed by a set 16 of one or more users 18. As mentioned earlier, all of the files and directories in a collection have the same permissions 20.

Each file 12 or directory 14 stored on a server 22 belongs to exactly one collection. This helps administrators manage server resources, without requiring that the administrators be given access to the content of the files or directories. In particular, an administrator should be able to get a list from the system of how many resources each collection is using (e.g., space, bandwidth, etc.), delete an entire collection that is no longer required, set replication policies for collections, and perform other tasks, all without requiring access to the content (which we sometimes called data) within a collection.

A collection is identified by a collection ID, cid 24.

Effective operation of the system is based on the creation, use, and elimination of public-private key pairs that are used in connection with encryption and decryption, signatures, controlling access, protection, authentication, and potentially other functions. Some of the kinds of public-private key pairs (we sometimes refer to a public-private key pair simply as a "key") are associated with collections, for example:

1. A collection owner key 26 can be used to protect metadata 28 associated with a collection 10 of an owner. Metadata 28 could include, for example, permissions associated with the collection. The collection owner key is also used to authenticate changes to collection metadata, such as changes to data retention policies 30 for the collection, on-demand flags 32 for the collection, and other metadata (see below).

2. A collection read key 40 enables a client to perform read operations in a collection and can be used to protect confidentiality of, for example, names 42 of files in directories of the collection, and contents 44 of files in the collection (indirectly using file keys, as we will describe later). The collection read key is also used to authenticate requests to the server by clients to obtain encrypted collection objects (files or directories) and file keys (described later).

3. A collection write key 46 enables a client to perform write operations in a collection and ensures that all directory entries in a collection and all contents of the files in a collection were produced by users or devices or both that were authorized users or devices or both of the system. This collection write key is used by a client to prove to the server that the client has write access to a collection. However, clients do not verify that contents of files received by the clients have been signed by a collection write key. Instead the system assumes that it is operating under an honest-but-curious threat model, in which, if the server were actively malicious, the server could supply an arbitrary public write key to other clients anyway.

4. A collection log key 50 is used to control access to logs 51 of accesses to collections. To be able to revoke keys, the server needs to be able to store multiple versions of each of the keys. The system can be arranged so that each stored key has a sequential version number (e.g., read key 0, read key 1, read key 2), and to be able to encrypt a key using key i+1. In that way, a user with access to a recent key can also get access to older versions of the key.

The server stores several pieces of metadata 52 for each collection, including the following:

1. An identifier (ID) 54 of the root directory for that collection (directories are described later).

2. An identifier (ID) 56 of the directory that should be used for incoming files for the collection.

3. A policy 58 that the server should apply when creating, maintaining, and deleting old versions of files and directories.

4. A policy 60 for when (if at all) to automatically delete files in this collection (e.g., if they haven't been modified for a year).

5. A policy 62 for when to delete old collection access logs (see below).

6. A policy 64 for when client devices should forget decryption keys and require users to re-authenticate (e.g., after 1 hour of inactivity, or every 8 hours).

7. An on-demand boolean flag 32 indicating that clients should fetch files (or, more precisely, file keys) from this collection on-demand, rather than downloading all file keys upfront. This flag is useful in connection with auditing accesses to the server to track which clients accessed which files.

8. Access control lists 68 of users or groups that have owner permissions, read permissions, and write permissions for the collection. Each member of an access control list (i.e., a user or a group) can have a hidden-acl flag 70 associated with its ACL entry 72. This flag indicates that this member's presence on the ACL should be hidden from other users that have access to this collection. (However, that member's presence is visible to the collection owner.). The manner in which the policies are expressed can vary.

For each collection, the server also maintains a log 51 of all accesses to keys for individual files. The log records which user and which user device accessed the file key. These access log entries 76 are encrypted using the collection log key, as well as and signed with the key of the user's device that initiated the action described in the log entry. The latter information allows a user to audit the server for all changes that are indicated as having been made by a particular user on a specific device.

The read keys, write keys, and log keys of a collection are signed by the owner's key. The owner key is authenticated only by the server. Anyone with access to the collection's owner key can change the collection's owner key. This means that if an adversary gets access to the collection owner key, and changes it to some new key (unknown to the legitimate owner), the collection might now appear to be "dead". However, all data can still be recovered, and the legitimate users and data can be moved by the system to another collection (with a different cid).

Changes to the collection keys, and changes to the collection retention policies, are reported to the collection owner. This is intended to alert the legitimate collection owner to possible upcoming data loss or collection takeover, if the collection owner key is compromised.

To defend against an adversary changing the retention policy and then deleting all data, retention policy changes take effect after a fixed interval (e.g., one week) elapses after the change is submitted to the server. In the meantime, owners get notifications of retention policy changes (and changes to the ownership of a collection).

Directories

As shown in FIG. 2, each directory 80 in a collection 82 is identified by a directory ID 84, "did". The directory includes a list 86 of entries 88 that maps the name 90 of a file or subdirectory to the directory ID or file ID of that file object or directory object.

Directory Entry

A typical entry 88 in the directory has several fields, including the following:

1. The name of the file or subdirectory 90, encrypted using the collection read key. The system does not perform fine-grained auditing of directory lookups. The name of a file or directory should be encrypted deterministically, using the containing directory's "did" as the initialization vector (IV). This ensures that names of files or directories that belong to a given directory can be checked for equality (i.e., that they are the same) by the server. At the same time, this approach does not disclose information about equality of names of directories or files in different directories, or what the names of the directories or files actually are. The equality of names in a given directory will become apparent over time, but the effort to avoid this may not be justified.

2. The directory ID, if this is a subdirectory, or a file ID (described below) 92, if this is a file. This directory ID or file ID is not encrypted; the server can see the structure of the directory of every collection, but cannot decrypt the file names within the structure.

3. The keys 93 of the user and client device that created this entry (see discussion later). These should be encrypted under the collection owner key, if the user's ACL entry has the hidden-acl flag set.

Directory Entries for Incoming Directories.

For incoming directories at the server (i.e., directories that store files uploaded by users to a collection for which the users have no permissions to read or modify files in the collection), a second type of directory entry 94 is used that includes, for example:

1. Information 96 about the client that uploaded the file including, for example: a timestamp, the user's key, and the device key. The information 96 should be encrypted under the collection owner key, if the client's ACL entry has the hidden-acl flag set.

2. A client-supplied file name hint 98, encrypted with the read key of the collection (public-key encryption). The client's suggested filename will be accepted unless there is a conflict (e.g., two clients upload files with the same name); then the server chooses a different file name.

3. The file ID 99 of the uploaded file. The system may be configured not to accept a client uploading an entire subdirectory. In some implementations, instead, client may aggregate all of the files together into a single ZIP file, for example, and upload that single ZIP file.

Directory Versioning

The system enables the versioning of each directory entry within a directory. To version directories, the server stores a validity period (start and end times) 100 with each directory entry. Directory entries are immutable except for their validity end times. When a directory entry is created, its validity start time is set to the current time, and the validity end time is infinity. When a directory entry is deleted, its validity end time is set to the current time.

Files

As shown in FIG. 3, file 104 in a collection 106 has a distinct (unique) file ID, "fid" 108. Each file ID is associated with one or more file versions 110, 112 (one of which is the latest version of the file 112). These versions correspond to snapshots of the file over time, as uploaded by clients to the server. Each version or snapshot of the file includes, for example:

1. A file key 114, encrypted under the collection read key. Having a separate key for each file helps with auditing and revocation. Each version has a unique key relative to each other version of the file.

2. The file contents 116, encrypted under the file key. A client can proactively download encrypted file contents, even if the collection is marked as on-demand, in order to speed subsequent accesses at the client to this file. If the user wants to access a given file that has been previously downloaded, the client need only download the corresponding file key, because the encrypted content of the file will be already available on the client. Consequently, in some implementations the server does not log downloads of file contents; it only logs downloads of the file keys.

To reduce the amount of space taken up by files, it would be possible to, for example, compress the contents of a file, chunk a file to help with interrupted uploads/downloads, or use fingerprint-based chunking similar to LBFS to help with small edits to a large file.

3. File attributes 118, such as Unix xattrs or MacOS metadata (e.g., resource forks). The system can store these attributes as a single blob, encrypted under the file key much as the file contents are encrypted. The stored file attributes should not include file permissions, setuid bits, and others.

4. The version ID 120. The version ID is chosen by the client and helps with concurrency control as suggested earlier. The client could construct the version ID by concatenating a randomly chosen client ID (at client install time) with a sequential counter from that client.

5. The modification time 122 of this version.

6. The key of the user 123 and the key of the device 125 that created this file version. These should be encrypted under the collection owner key, if the user's ACL entry has the hidden-acl flag set.

Client State and Versioning

In some implementations of the system, the client tracks the mapping between files and directories stored locally at the client and the fid IDs and did IDs of the files and directories stored on the server. To do this, the client persistently identifies local files (e.g., using inode numbers in Linux/MacOS, or using nFileIndex on Windows, from BY_HANDLE_FILE_INFORMATION), and stores a mapping between these local IDs and the IDs.

When uploading files to the server, the client uses versioning information to deal with the possibility of concurrent changes being made to files or directories by other clients and with the possibility of failure during upload.

Figure 4:
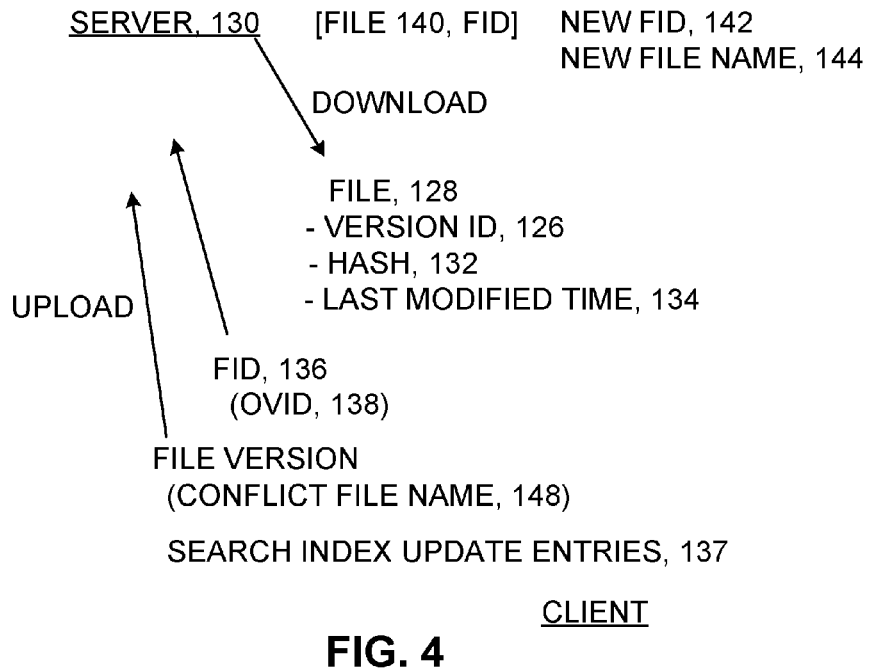
FIG. 4 is a schematic diagram of server-client interaction with respect to versions.

As shown in FIG. 4, in particular, the client keeps track of the version ID 126 associated with each file 128 downloaded from the server 130, along with a hash 132 of that file's contents, and a last-modified time 134 (as an optimization for boot-time scanning). When the client detects that the file has been modified locally (e.g., during normal operation, or after a restart and scanning the entire file system), it uploads a new version of the file fid 136 to the server, and includes the old version ID "ovid" 138 in the request.

On upload, if the last version of fid for the file 140 on the server is not ovid, the server flags a conflict. The server deals with a conflict by creating a different file ID 142 for this version and giving it a different file name 144 in the containing directory (e.g., Conflicting version of F by Alice). To this end, with every file version upload, the client should supply a conflict file name 148 for the containing directory, which the server will use in case of concurrent file uploads.

In case the conflict file name already exists, the server will return an error to the client. The client should then retry uploading the file. A strategy to avoid conflict can be to include random bits in the file name, either initially or on subsequent uploads.

To deal with failures during upload, the client should first generate a new version ID for the file being uploaded, then write that version ID to disk locally, and then start uploading the file. If the network or client crashes, the client can query the server to see if it has received the file's new version ID in full. If so, the client can assume the upload succeeded, and update the version ID locally.

Otherwise, the client can restart the upload.

When uploading a file, the client should also upload search index update entries 137 (see below). To avoid re-indexing the entire file on upload, the client should locally store the set of keywords that were present in the old version of the file (which should be much smaller than the file itself). Then, when uploading a new version of the file, it can compute the delta (which keywords were added, and which keywords were removed), and produce a small set of search index updates for uploading.

Keyword Search

The system enables keyword searching over the files and directories in the collection. The operation of such keyword searching can depend on whether the client has a complete copy of the collection available locally.

Figure 5:
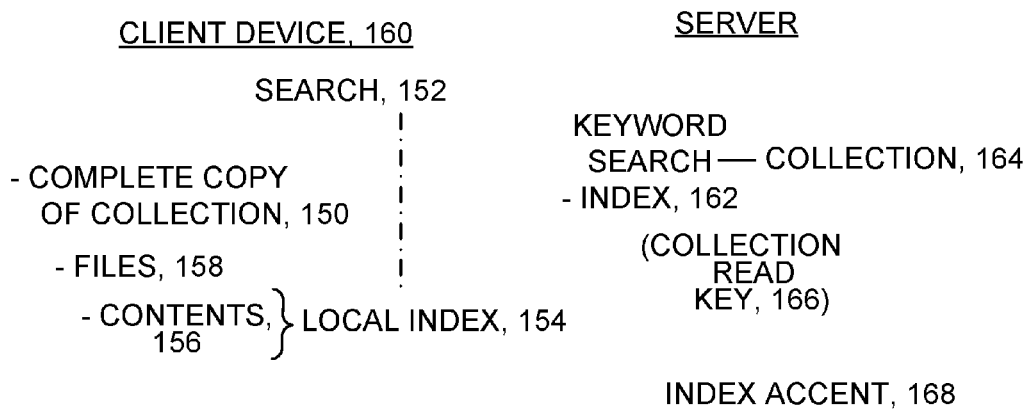
FIG. 5 is a schematic diagram of a search facility

As shown in FIG. 5, if client has a complete copy 150 of the collection stored locally, execution of the search 152 works by (previously?) building a local index 154 at the client over the contents 156 of all files 158 and performing the search on the client device 160.

For the case in which the client does not have a complete copy of the collection stored, the system builds a keyword search index 162, stored at the server, for each collection 164. The search index at the server is protected by the collection read key 166. Even though the search index has keywords from all files in the collection, the system does not encrypt the search index using individual file keys. When a server executes a query and the search matches a document, the server records an "index" access 168 for that user (as opposed to a "read" access entry). This may help administrators audit accesses and distinguish the act of explicitly reading file contents from the act of inferring things about file contents based on search index hits.

Keyword Extraction

The client software provides a set of keyword extractors for different document formats.

The client uploading a modified document is responsible for determining the format of the file and running the appropriate keyword extractor. For example, for MS Word documents, the system can use the Python docx module or antiword. For PDF files, the system might use Xpdf's pdftotext.

Keyword extraction for a directory will index the file names (broken up into keywords based on delimiters like whitespace and punctuation).

Index Structure

As shown in FIG. 6, the search index 170 resembles a chained hash table, which is indexed by keyword 184 and contains pointers 196 to documents 176 that have that keyword.

In some implementations, the search index includes two parts: the hash table array 178 and the file references 180 (corresponding to chain elements in the hash table). The hash table array is a fixed-size table, indexed by the hash 182 of a keyword 184, and including pointers 186 to file references 188 to files containing that keyword (or null entries). Each file reference contains, for example, four items: the file ID (fid) or a directory ID and file ID pair 190 (did and fid, for index entries reflecting a filename), a long hash 192 of the keyword (to deal with possible hash collisions in the hash table array), an entry type 194 (keyword-present or keyword-not-present; see below), and a pointer 196 to the next file reference in the chain. In some cases, the pointers are 64 bits each, and there are on the order of 1M entries in the hash table array, making it about 8 MBytes.

To hide information from the server, each cell 198 in the hash table array is encrypted under the collection read key, and pointers in the file references are encrypted using a key 200 derived from the collection read key. In particular, the key for a pointer is a pseudorandom function (PRF) of the collection read key and the hash table array index where this pointer appears. All pointers in a chain of file references are encrypted under the same key.

To deal with changes to the collection read key (e.g., as a result of key revocation), each encrypted pointer stores the version number 202 of the read key that was used, and the encrypted text under that read key. This avoids having to download and re-encrypt the entire index structure when changing the collection read key.

This construction enables a client to search efficiently for the files containing a keyword. The client first computes the array index 182 corresponding to the keyword being searched for. The client then computes the pointer keys (see above), gives them to the server along with the array index, and asks the server to return the list of documents in that chain.

When searching for multiple keywords, the client sends the information about all keywords to the server, and the server performs the intersection between sets of documents matching each of the keywords. The server returns to the client the set of documents that match all of the keywords.

The server logs an "index" access to the returned documents that match all of the keywords and does not log any access to documents that matched only a strict subset of the keywords.

Index Maintenance

To keep the index up-to-date with changes to files in a collection, the system maintains a log of index updates. Whenever a client uploads a file, it also uploads a list of index update operations to be performed at the server, such as: add a mapping from keyword to fid, or remove a mapping from keyword to fid. All entries in the index update log are sequentially numbered by the server, and are encrypted under the collection read key.

The hash table array keeps the number of the last update log entry that is reflected in the index.

The server can garbage-collect all older update log entries. Clients that want to perform a search need to download any subsequent log entries, and check each of them in turn.

To keep the index working efficiently, clients periodically apply update log entries to the local index and upload a new index. A client can propose to the server that the client will apply log updates; in this case, the server gives the client a short-lived lease (e.g., an hour), during which time other clients will not be allowed to update the index. During this time, the first client is expected to download the hash table array and the update log entries, upload new file reference objects, and upload a new hash table array (with an updated position into the update log). For keyword deletion operations, the client is not expected to search through the chain and find the previous entry. Instead, the client inserts a keyword-not-present entry.

When a client changes the hash table array, the client re-encrypts each element in the array, even if the element is not changed by the client's updates. This ensures that the server does not learn about keywords that were updated in the index. The server gets to know only about keywords that clients actually perform searches for.

When a server traverses a chain of file references, it should also perform two maintenance tasks: collapse matching keyword-not-present and keyword-present entries, and remove entries that refer to files that have been deleted.

Keyword extraction can be implemented in a wide variety of ways. In another approach that may be better than the one described, the client software provides a set of keyword extractors for different document formats. The client that is uploading a modified document is responsible for determining the format of the file and running the appropriate keyword extractor prior to uploading. For example, for MS Word documents, the system can use the Python docx module or antiword. For PDF files, the system might use Xpdf's pdftotext. Keyword extraction for a directory will index the file names (broken up into keywords based on delimiters like whitespace and punctuation).

Key Management

As shown in FIG. 7, the system manages several different kinds of keys: collection keys 220 (owner keys 222, read keys 224, and write keys 226); user keys 228; group keys 230; and device keys 232. Any of these keys may need to be changed over time, for example, due to revocation. Therefore the system is able to identify each principal 234 (collection, user, group, and device) using a permanent ID 236 for that principal that is independent of that principal's current key 238.

Each collection principal 239 is identified by its collection ID, cid 240. The keys for a collection are the collection owner keys, read keys, and write keys.

Each user principal 241 is identified by its email address 242. Each user has a single public-private key pair 244.

Each group principal 245 has a long-term ID 246, probably an opaque server-chosen value. Each group principal has a public-private key pair 248 that represents membership in the group, and each group principal is also associated with an owner public-private key pair 250 (which could be a user or another group). Each group has a name 252, stored at the server; name changes must be authenticated by the group owner key.

The server keeps the current group key 248 encrypted under the current key 244 of each of the members of the group. These wrapped keys are produced by the group owner when changing the group key or adding new members. These wrapped keys are tagged with the corresponding member user ID 242, so that a user can discover what groups she is a member of (and the server can find collections that a user can access).

Each group principal also has a list of user principals (email addresses) who are supposed to be part of that group. This is used when updating the group key (e.g., for revocation), when the client needs to re-encrypt the new group key for each member and it needs to locate the set of all members in the group. In order for the server to prove that this list is correct, the server must supply the previous set of wrapped keys (i.e., the old group key encrypted under each group member's public key). The client verifies the membership list by re-encrypting the old group key under each member user's public key and checking that the encryption matches. This requires the client to reuse the same randomness, so as to make the encryption scheme deterministic. The client must also verify that the server supplied the correct user public keys. To do this, the server must include a certificate, for each group member, attesting that the user had the associated key at some point in time (it need not be the most recent key); see the additional discussion below about user public key certificates.

Some implementations may support hidden groups, where the server can't tell what the membership is. In that case, the group membership list may be encrypted and the the group wrapped keys are not tagged. The system them would not be able to enumerate what hidden groups, or hidden collections, a user has access to, and may need to do a less efficient search when a user tries to get access to a collection that's hidden or that involves a hidden group.

Each device principal 270 is identified by the email address of the device owner, combined with an opaque value. An important goal of device keys is to help track down changes made from a stolen device during revocation. Each device has a name 272 (which can be modified by the device owner), along with a timestamp 274 of when the device key was registered (or the device name was modified). Users can always register new devices.

All server operations must be authenticated by a user key and a device key. The only exception is registering the first device, which does not require authentication with an existing device key. Subsequent devices must be registered with the help of an existing device and thus must be authenticated with the device key of the existing device.

The server keeps a log of all group membership changes, user device changes, group name changes, and device name changes, along with which user key and device key initiated each change.

For garbage collection, a concern is group keys. It's always safe to delete group keys encrypted for users who are no longer members of that group, and, except possibly for the hidden group feature referred to earlier, the server knows what user is associated with every wrapped key.

One exception is a situation where an adversary gains control of a group owner's key, and removes all previous users from that group. To ensure that data (e.g., files in a collection that's accessible to this group) associated with that group can still be recovered after this compromise, we use the notion of a recovery ACL on a collection. The recovery ACL behaves like the read ACL, with the exception of being "time-delayed"; that is, members of the recovery ACL can still fetch data from a collection for a certain time period (say, 30 days) after they have lost access to the collection. This would allow members of the recovery ACL to download the contents of the collection from before this compromise took place, even after their access has been revoked. (Of course, due to encryption, they would be able to decrypt only the version of the data that existed prior to the adversary's actions; subsequent changes may be encrypted with a new key generated by the adversary, which might not be accessible to legitimate users.) Since a recovery ACL might refer to a group, the server should not garbage collect old group-member wrapped keys for at least that time period (30 days in the example above).

Users may, however, need access to the old version of a group key (e.g., because a collection's key is encrypted for an old version of a group key, rather than the latest version). We can support this in two ways: either keep old wrapped keys as-is, or encrypt old versions of a group key for newer versions of the same group key (much as with collection keys themselves). The only case where the choice of these two options matters is when we have a large group with lots of churn. Here, the second option uses roughly linear space on the server, whereas the first option uses roughly quadratic space on the server.

User Keys

User private keys are stored on user devices and cannot be obtained from the server using a password.

The server might, however, store an encrypted copy of a user private key, encrypted for the user's approval group, as discussed later.

Account Creation.

When a user first creates an account, the user must create a fresh private key on her own device and then register the corresponding public key with the server. Since the user device stores the only copy of the user's key, the user (or the client software running on the user's device) needs to take steps to prevent the key from being lost if the device breaks. The system provides two mechanisms to achieve this: approval groups and copying the key to other user devices.

The system also may require a phone number for sign-up, largely as a "spam-control" measure. The server will allow only one account creation per phone number, by sending an SMS message to confirm phone number ownership. Phone numbers would not be used for two-factor authentication, because the server cannot be trusted to run the two-factor-authentication protocol correctly.

Device Bootstrapping.

When the user wants to install the client on a new device, the user transfers her key from her existing device. This is done in three steps: (1) establish a secure channel between the two devices, using a fresh session key, as would be done in key exchanges using Diffie-Hellman; (2) authenticate the session key to prevent MITM (man in the middle) attacks; and (3) transfer the user private key to the new device over secure channel.

For step (1), one way to communicate between the two devices is through the server. As long as the user is diligent about the second step, a compromised server should not be able to break the security of device bootstrapping.

Alternatively, the communication could be broadcast over the local network, or QR codes or any other alternative that offers a good user interface could be used.

In step (2), the two devices must agree that they're using the same session key to prevent MITM attacks. This can be done by displaying a PIN (e.g., hash of the session key) on one device and asking the user to type it into the other device; or by displaying a QR code on one device and asking the user to scan it in on the other device; or by some other appropriate technique.

After transferring the user private key, the new device creates a new device private key (which it never transfers to anyone else) and registers the device public key with the server, under a device name entered by the user (perhaps defaulting to something generic like "iPhone registered Jan. 5, 2016").

Identity Providers (IDPs)

As shown in FIG. 8, to authenticate user public keys, the system relies on identity provider servers (IDPs) 300. Each identity provider server maintains a database 302 of user email addresses 304, along with the public key 306 for each user, and the approval group 308 for that user (see additional discussion below about approval groups) stored as a list of email addresses for the approval group members. The identity provider implements three operations, as follows.

(1.) Register a new user. The IDP gets an email address of a new user who wants to register for an account. The user might not have generated a public key yet, because this might be an invitation email that the system wants to send to the user. If the user account already exists in the database, the IDP rejects the request. If the user account doesn't exist, the IDP sends an email to the user's email address, with an un-guessable verification token.

The user can present this token back to the IDP along with a public key and a signature (using the corresponding private key) of the request to register with this email address. The signature ensures that the owner of the corresponding private key does want to register an account with this email address. Once this request is processed by the IDP, the account is entered into the database.

The system allows the user to initiate registration multiple times, until the user finishes the process. This allows the user to misplace the first invitation email he got, and still register for an account later.

(2.) Certify a user's public key. Given a user's email address, the IDP can generate a certificate attesting to the binding between the user's email address and the public key. The certificate includes a timestamp, which will help clients ensure freshness.

(3.) Update the registration record. An IDP allows updating the user's record, which consists of the user's public key and the approval group. The request must be signed by the user's private key, and by the approval group (if present). The update can modify both the user's public key, and the approval group.

Requiring an approval group's signature for changing the user public key ensures that an adversary that steals a user's private key cannot hijack the account (unless they compromise the approval group members as well).

The approach of using a combination of multiple IDP's with approval by an approval group distributes trust within the system including distributing trust both across a set of electronically accessible machines (for example, the IDP's) and also across a set of humans (for example, the members of an approval group). Approval groups are used to authorize certain privileged or protected operations because it is safer to trust, for example, x of y human members of an approval group than to trust a single human administrator. Using multiple machines, such as the IDP's, for the other aspect of trust can lower the probability of a successful attack, because the attacker must be able to conquer more than two or more machines (that are, ideally, managed by different organizations, operating in different clouds, and written by different programmers).

User Account Creation Workflow

The system enables several different scenarios for how a user might create an account. The user might visit the system's web site and decide to join; the user might be invited by another user; or the user might be invited by a corporate administrator as part of a bulk user invitation. In all cases, the system may apply the same workflow:

1. The user's email address is given to the server (perhaps by the user herself, if she is visiting the system's web site).
2. The server asks one of the IDPs to send a verification email to the user's address, containing a link for downloading the client.
3. The user clicks on this link to download the client to her device, if not already installed.
4. The user runs the client, which generates the user's public-private key pair, and sends a registration request to all other IDPs (except the first one, which already sent a token to the user).
5. The IDP emails contain tokens in a system://URL schema, so that when the user clicks on them, they are handed over to the local client. When one of the IDPs is the system's download server (from step 2), the download link can contain the token from the system's IDP, and the token will be embedded in the user's downloaded installer executable. This allows the user to click one less link to set up her account.
6. The client can now finish the registration process with each of the IDPs by sending its public key, its token for that IDP, and a signed request (with the user's private key) asking to register under the user's email address.

Key Lookup

When a client wants to look up the public key for a given user u, it asks the server to give it recent certificates from all of the IDPs attesting to u's public key. The server asks each of the IDPs to provide a certificate for that user's public key. The client checks that it gets certificates from each IDP, and that the certificate timestamps are recent (within some fixed time window in the past, e.g., one day from now). Checking for a certificate from each IDP guards against compromises of some strict subset of IDPs. Checking for timestamps guards against rollback/freshness attacks.

As a possible optimization, to reduce the load on IDPs, the server can cache these certificates for a short time, corresponding to the freshness interval required by a client. The client can supply the expected freshness interval when requesting certificates from the server.

Key Recovery with Approval Groups

Key recovery is used to regain access to a user's account if the user is, for example, missing, fired, or loses all other ways to obtain her key (for example, if all of the user's devices have been destroyed). Each user key can be associated with a set of recovery user principals (e.g., the user's boss, an administrator, etc.), called an approval group.

The user's key is secret-shared among the recovery user principals of the approval group and the server. The structure of the approval group is configurable and can support whatever can be expressed with Shamir secret-sharing (e.g., any two of three principals), including nesting of Shamir secret-sharing (e.g., any two of three principals AND any one of these other three principals). These recovery principals can agree to recover the user's key. The server "owns" one share of the key as well, so that it can log every attempt to recover a key. This ensures that, if the recovery mechanism is misused, it will be easy to detect. When a user's key is recovered, a notification is sent to all of the devices belonging to that user.

In some implementations, an approval group can be thought of as a nested structure, each level of which consists of two pieces of information: (1) a list of entities that must approve an operation, and (2) how many of those entities must approve the operation. An entity in this list can itself be such an approval group, thus making this construction nested. As an example, the approval group ({Alice, Bob}, 2) requires approval from both Alice and Bob. The approval group ({({Alice, Bob}, 1), Chuck}, 2) requires approval from one of Alice or Bob, and also from Chuck. Typically, the top level of an approval group would contain the server as part of the list and require that all of the entities in the top level group must approve. This ensures that the server must be involved in every approval group operation. The server will approve any approval group operations (e.g., recovering a key), and will log every operation it approves, enabling future auditing of approval group operations.

To encode an approval group using nested secret sharing, each level of the approval group is implemented using Shamir secret sharing. For example, when a secret key K is encrypted for an approval group that contains M entities on its list of which N must approve, the key K will be shared using an N-of-M Shamir secret sharing scheme. Each share of K is encrypted for the key of the principal representing the entity (e.g., a user's public key or a group's public key). If the entity is a nested approval group, then its share of the secret is re-distributed using Shamir secret sharing in that lower-level approval group.

In some cases, key recovery is needed to access a specific object (e.g., a single file in some collection), rather than to recover a user's key in its own right. In this case, recovering the key directly runs the risk that the recovered key will be used to access other data as well, and the user whose key was recovered (or a collection whose key was recovered through approval groups) has no assurances about what data was or was not accessed by the approval group.

To address this problem, we use secure multi-party computation (SMPC) to perform recovery of more-specific keys. For example, say there is some approval group G associated with key K (this might be a user key or the key of some collection). The approval group members decide they need to access some data (say, file F) that is accessible to key K. Instead of using secret sharing to recover key K, the approval group members run an SMPC protocol to collaboratively decrypt the key corresponding to file F. In our design, if file F is accessible to key K, then file F's key must be encrypted under some chain of keys that is eventually encrypted for key K. This chained decryption is executed under SMPC. As a result, all approval group members agree what file(s) were recovered with their approval, and, since the server is a member of every approval group, the server also logs information about what specific objects (e.g., files) were recovered.

Secure multi-party computation can be used to specialize the approval group's action in several ways. One example, described above, uses SMPC to have the approval group members agree on recovering a specific file from a collection. In some examples, SMPC is used to search for documents matching specific keyword(s) in a collection, so that the approval group can find the file to be recovered in the first place, and to list the files in a collection to help the approval group find files they may need to decrypt.

In some cases, SMPC is used to add specific users to groups or to change the access control lists on a collection. To enable the use of SMPC, the client software can be preconfigured with SMPC programs for each functionality that can be performed through approval groups (such as the examples above). When approval group members agree on some operation, their clients choose the relevant SMPC program and use an SMPC protocol to collectively execute that program. The server also knows of these programs and executes them when it is a member of an approval group, logging information about what program was executed and what some of its inputs were.

As shown in FIGS. 9, 10, and 11, approval groups can be managed by administrators in the system through an easy to use web browser based approval group management feature.

As shown in FIG. 9, an administrator's page 400 provides an opportunity for an administrator (for example an administrator working in a company that uses the system for secure communications) to perform functions 402 with respect to teams, approval groups, events, notifications, policies, archives, and billing. The page shown on FIG. 9 appears when the administrator invokes the approval groups navigation control 406. In this example, the administrator has created and is managing three different approval groups 404 for three different departments of the company, marketing administration, engineers, and leadership. The name of each of the groups is an active control that when invoked by the administrator causes a corresponding window to be opened.

In this example, when the marketing administration control 408 is invoked, the page 407 shown in FIG. 10 is presented. This example illustrates the simplicity with which the administrator can configure an approval group. An existing member of a group can be removed by clicking the remove control 410 that appears in the row that identifies that member. A new member can be added simply by typing the name of the member in the text box for 12 and clicking the add button 414.

In this example, the status of each member can be either "required" (in which case that member's approval is necessary for the approval of the group to be achieved) or "optional" (in which case the particular member's approval is not required). For the system to determine that the group is approved, not only must the required members approve, but also a number of the optional members specified by the selectable number that appears in box 416.

As shown in FIG. 11, when a user has invoked the policies navigation button 418, the page 420 is presented. Here the administrator is easily able to define policies for approval of specified kinds of actions or events 422 that can occur in the system. For each record 424 in the actions and approval table, the user can select 426 which group holds the implementation responsibility for that action, and can select 428 which group holds the approval authority.

The arrangements of FIGS. 9, 10, and 11 not only make the process of creating, deleting, and managing approval groups extremely simple, they also provide very easy-to-read information about different kinds of events, approval groups, and the members of the approval groups.

For example, the administrator can add a member to a group simply by typing the members name and clicking once. A member can be removed by clicking once. A member's status can be changed by clicking once. An approval group can be associated with an event by clicking once.

Key Change and Revocation

The server stores a list of revoked user keys and revoked device keys, which should no longer be acceptable for authenticating the corresponding users or devices. This provides more immediate revocation than the freshness checking on certificate timestamps described above. A public key can be revoked by signing a request with the corresponding private key.

To deal with a lost or stolen device, the user should:
1. Revoke the lost device key.
2. Change the user's private key. When a user changes her private key, she must re-encrypt the new private key for her approval group. The user also needs to get a signature from her approval group to update her public key in the IDP. The user must also propagate the new key to all of her devices. The user can do this using the device bootstrapping protocol discussed above. It may be possible to simplify the user workflow by having devices announce to each other what version key they have (unlike initial bootstrapping, devices might already know about each other, perhaps through the server).
3. Ask the server for a list of changes received from the lost device, beginning at the time when the device was lost. This should include both changes to collections (e.g., directory entries or file versions), as well as registrations of, for example, new device keys, changes to group membership, or changes to group names.

Even though collection log entries are encrypted, each log entry is accessible to the user who initiated the associated operation.

For collections that a user accessed using a hidden-ad ACL entry, the user should explicitly ask the server for log entries from that collection (since the server doesn't otherwise know the user might have made changes there). The intended use case for hidden-ACL collections is largely read-only or append-only situations, so this should not arise in practice often.
4. Manually audit the list of changes to determine which might need to be rolled back.
5. Change keys for all collections that the user had access to.

Changing a collection key involves creating a new owner key, a new read key, and a new write key, encrypting the old key under this new key and telling the server about the new key. The system assumes that old file contents can still be accessed by a malicious server, and the goal is to keep the server from accessing new file contents afterwards. The system also assumes that clients will periodically poll the server to obtain the latest collection read key.

Changing a group key involves creating a new group key, looking up the group membership list from the server, encrypting the new key under the keys of all members, finding all collections that have given access to this group, changing those keys (and re-encrypting them under the new group key), and telling the server about the new group key.

Access Control

Access control for a given collection is achieved by ensuring that the right users have access to a collection's owner key, read key, and write key. Earlier, we described how the server stores group keys wrapped under the key of each group member, along with a reference list of group members. For access control, the server stores a similar data structure.

In particular, each collection stores a list of user principals or group principals that should have access to the collection owner key, read key, or write key. In the case of hidden-acl ACL members, this list entry is encrypted with the collection owner key. To authenticate this list, we use the same technique as for authenticating group members, described earlier, namely, by requiring the server to provide the previous wrapped keys.

Each collection also stores the collection's owner key, read key, or write key encrypted with the latest key of the corresponding principal from the access list (e.g., for each user on the read access list, the server stores a copy of the collection read key encrypted under the user's key). As with groups, this list of wrapped keys is tagged with the ID of the principal that has access to the collection (except for wrapped keys that correspond to hidden-acl members of an ACL, in which case no such tags are present).

To discover which (non-hidden) groups a user is a member of, or which (non-hidden-acl) collections a user has access to, the user can query the server. The server will look for the user's principal in group wrapped key tags, and then in collection wrapped key tags, and return the resulting list of groups or collections.

When a user has access to a collection through hidden-ad ACL membership or has access through a hidden group, the user can directly request access to a particular cid. The server will respond with the set of all untagged wrapped keys for that particular cid; it does not know which one the client will be able to decrypt. The client can try to decrypt each of these keys in turn. If the access is through a hidden group, the client must know which group it is; in this case, the client can request all wrapped keys for that hidden group, and try to decrypt each of them in turn.

Client-Server Protocol

Secure Channels

Because the system trusts the server to be honest-but-curious, the system must ensure that other adversaries cannot tamper with the connection between clients and servers. To this end, all communication between clients and servers is protected by TLS. Clients pin a specific certificate authority (perhaps managed by the system), which is the only certificate authority allowed to sign certificates for the system's servers.

Server operations should also be authenticated by a particular user key and device key. Two exceptions are login operations (which uses a separate authentication protocol), and device creation (which are authenticated using the user key plus a separate authentication protocol).

As an implementation detail, it might be easier to authenticate using a cookie-like token (e.g., something signed with the user's private key and the device key), rather than signing the entire request. The system assumes that the server is honest-but-curious for everything except the keys themselves, so it is acceptable to trust the server to verify this token, rather than explicitly signing the request for other clients to verify.

Streaming Uploads

To enable clients to perform bulk uploads (without waiting for a round-trip time for each individual operation), the protocol should allow the client to choose identifiers (e.g., directory IDs, file IDs, file version IDs, etc.). For example, if the client wants to create a new directory, and then create a file in that directory, it should be able to send a request that creates a directory (with a client-chosen directory ID), together with another request that creates a file in that directory (whose ID is already known to the client). For simplicity, client-chosen IDs could be a concatenation of an install-time random client ID and a sequential client-local counter (which has to be stored in a suitably persistent way).

Notifications

A client can register to receive change notifications from a server for a particular collection. When the server gets a modification for a file or directory in a collection, it sends a notification to that client, informing it that a particular file or directory was changed. The client can then download the new version of that file or directory.

Additional Aspects Associated with Email

If the system is to authenticate the sender of an email, the sender should include a certificate for their own public key as of the time the message was sent. This allows the recipient to verify the authenticity of the public key; otherwise, the current public key might not match the public key at the time the message was sent.

The system may include a technique for handling email aliases, that is, multiple email addresses that should map to the same account. Having a separate key for each of the user's N email addresses makes key management harder for the user (e.g., by requiring the user to get N signatures from approval groups to recover lost key or to change key). An "alias" flag on an email address could be used to tell the client that the message should be forwarded to a different address.

Although we frequently have discussed the system and techniques in the context of email messages, many of the features are also applicable to the direct or group chat messages Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The devices that we describe as processing data encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA or an ASIC.

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Other implementations are also within the scope of the following claims.

The invention claimed is:

1. A computer-implemented method comprising
at a central server, managing a document sharing process that comprises uploading from client devices through a communication network, storing at the server, and downloading to client devices through the communication network encrypted documents that are shared between users of the client devices,
using encryption keys at the client devices to encrypt and decrypt the documents, each of the encryption keys being associated with a particular one of the users,
at the time of and as a condition to recovering one of the encryption keys associated with one of the users, generating approval information by a process that relies on an approval group of at least two entities, the encryption key having been secret-shared among entities of the approval group, the secret-sharing comprising nested secret sharing, at least one of which is the entities being a human other than the user and at least one of which is the entities being a server separate from the human, a share of the encryption key having been provided secretly to the human, and a share of the encryption key having been provided secretly to the server, the approval information confirming that the recovering of the encryption key meets predefined conditions for approval by the approval group including a condition that the human have used one of the shares of the encryption key to indicate human agreement to the recovery of the encryption key and a condition that the server have used one of the shares of the encryption key to indicate server agreement to the recovery, and
controlling the recovering of the encryption key based on the approval information generated at the client device.

2. The method of claim 1 in which controlling the recovering of the encryption key comprises preventing the recovery.

3. The method of claim 1 in which controlling the recovering of the encryption key comprises tracking the recovery.

4. The method of claim 1 in which the process for generating the approval information comprises an identification processor service receiving a signature of the approval group.

5. The method of claim 1 in which recovering the key comprises applying a secure multi-party computation among members of the approval group.

6. The method of claim 5 in which applying the secure multi-party computation comprises decryption of a chain of keys.

* * * * *